(12) United States Patent
Kwon

(10) Patent No.: US 6,346,969 B1
(45) Date of Patent: Feb. 12, 2002

(54) COLOR FILTER ARRAY AND ITS COLOR INTERPOLATION APPARATUS

(75) Inventor: Oh Bong Kwon, Kyoungki-do (KR)

(73) Assignee: Hyundai Electronics Industries Co., Ltd., Ichon (KR)

( * ) Notice: Subject to any disclaimer, the term of this patent is extended or adjusted under 35 U.S.C. 154(b) by 0 days.

(21) Appl. No.: 09/000,820

(22) Filed: Dec. 30, 1997

(30) Foreign Application Priority Data

Dec. 30, 1996 (KR) ............................................. 96/76308

(51) Int. Cl.$^7$ ................................................. H04N 3/14
(52) U.S. Cl. ........................ 348/273; 348/266; 348/274; 348/280
(58) Field of Search .................. 348/242, 260, 348/266, 273, 274, 275, 276, 277, 280; 358/513; 349/106; 382/162, 167; 257/440

(56) References Cited

U.S. PATENT DOCUMENTS

| | | | |
|---|---|---|---|
| 4,605,956 A | * | 8/1986 | Cok ............................ 348/273 |
| 4,945,406 A | * | 7/1990 | Cok ............................ 358/516 |
| 5,099,317 A | | 3/1992 | Takemura |
| 5,119,180 A | | 6/1992 | Okamoto |
| 5,374,956 A | | 12/1994 | D'Luna |
| 5,565,742 A | * | 10/1996 | Shichao et al. .............. 315/366 |
| 5,901,242 A | * | 5/1999 | Crane et al. ................. 382/166 |

FOREIGN PATENT DOCUMENTS

| | | | |
|---|---|---|---|
| EP | 0 415756 A2 | 3/1991 | |
| EP | 000632663 A2 | * 1/1995 | ............ H04N/9/04 |
| GB | 2091968 A | 8/1982 | |
| GB | 2105143 A | 3/1983 | |
| JP | 008214320 A | * 8/1996 | ............ H04N/9/04 |
| JP | 008265782 A | * 10/1996 | ............ H04N/9/04 |
| WO | wO86/01964 | 3/1986 | |

* cited by examiner

*Primary Examiner*—Wendy R. Garber
*Assistant Examiner*—Mitchell White
(74) *Attorney, Agent, or Firm*—Jacobson Holman, PLLC

(57) ABSTRACT

A color filter array and its signal process circuit in which vertical interpolation process is not needed, which can be applied to the field of image signal input and signal process such as video camera, digital camera and color scanner, and color copier which process image signal. The color filter array is constituted such that the number of green color filter becomes double of those of red and blue color filter respectively in order to make human color recognition easy, and that the red and blue color filters are placed every four pixels and green color filter is placed every other pixel, such as a filter pattern consisting of R-G-B-G, G-R-G-R and B-G-R-G filter groups.

13 Claims, 3 Drawing Sheets

COLOR FILTER ARRAY AND ITS COLOR INTERPOLATION APPARATUS

BACKGROUND OF THE INVENTION

1. Field of the Invention

The present invention relates generally to a image sensor, more specially to a color filter array and its signal process circuit in which vertical interpolation process is not needed, which can be applied to the field of image signal input and signal process such as video camera, digital camera and color scanner, and color copier which process image signal.

2. Description of Prior Art

In general, each basic pixel of color image sensor is covered with color filter so that the complexities of the signal process depend on the pattern of the color filter structure. Though each pixel is divided as Red color filter pixel, green color filter pixel and blue color filter pixel in order to produce color image signals, each pixel has to have all of the color signals (R, G, B) in accordance with interpolation method to make signal process.

FIGS. 1a and 1b show the conventional structures of color filter array to make red, green and blue signal process (hereinafter red, green and blue signals are respectively referred as R, G and B signals). FIG. 1a shows a filter pattern consisting of R-G-B, G-B-R and B-R-G filter groups and FIG. 1b shows a filter pattern consisting of R-G and G-B filter groups.

In FIG. 1a, pixel values between each signal should be obtained because each R, G and B signal crosses every three pixels. For example, the interpolation equation to get color signal ($C_{12}$, $C_{21}$) for two pixels between first signal ($C_1$) and second signal ($C_2$) is as follows;

color signal $(C_{12}) = \frac{1}{3}(2C_1 + C_2)$, color signal $(C_{21}) = \frac{1}{3}(C_1 + 2C_2)$ Since such an equation for interpolation process needs ⅓ multiplication calculation and it is difficult to process its valid number, circuit structure becomes complex.

Color filter arrays in FIG. 1 make a structure in which the human color sensibility level is considered and the number of pixel of G is double of the number of pixels of R and B respectively. However, there are some problems that the circuit becomes complex since both horizontal and vertical interpolation processes are needed in such a structure, and the circuit becomes large since the line delay buffers for vertical interpolation are used additionally.

SUMMARY OF THE INVENTION

An object of this invention is to provide a color filter array and its color interpolation apparatus which can operate at high speed and can interpolate the color signal without vertical interpolation as a simple structure.

BRIEF DESCRIPTION OF THE DRAWINGS

The foregoing object, aspects and advantages will be better understood from the following detailed description of a preferred embodiment of the invention with reference to the drawings, in which:

FIGS. 1a and 1b show a conventional structure of color filter array for processing red signal, green signal and blue signal;

FIG. 2 shows a structure of color filter array in accordance with the invention.

DETAILED DESCRIPTION OF THE PREFERRED EMBODIMENT

Figure 3:
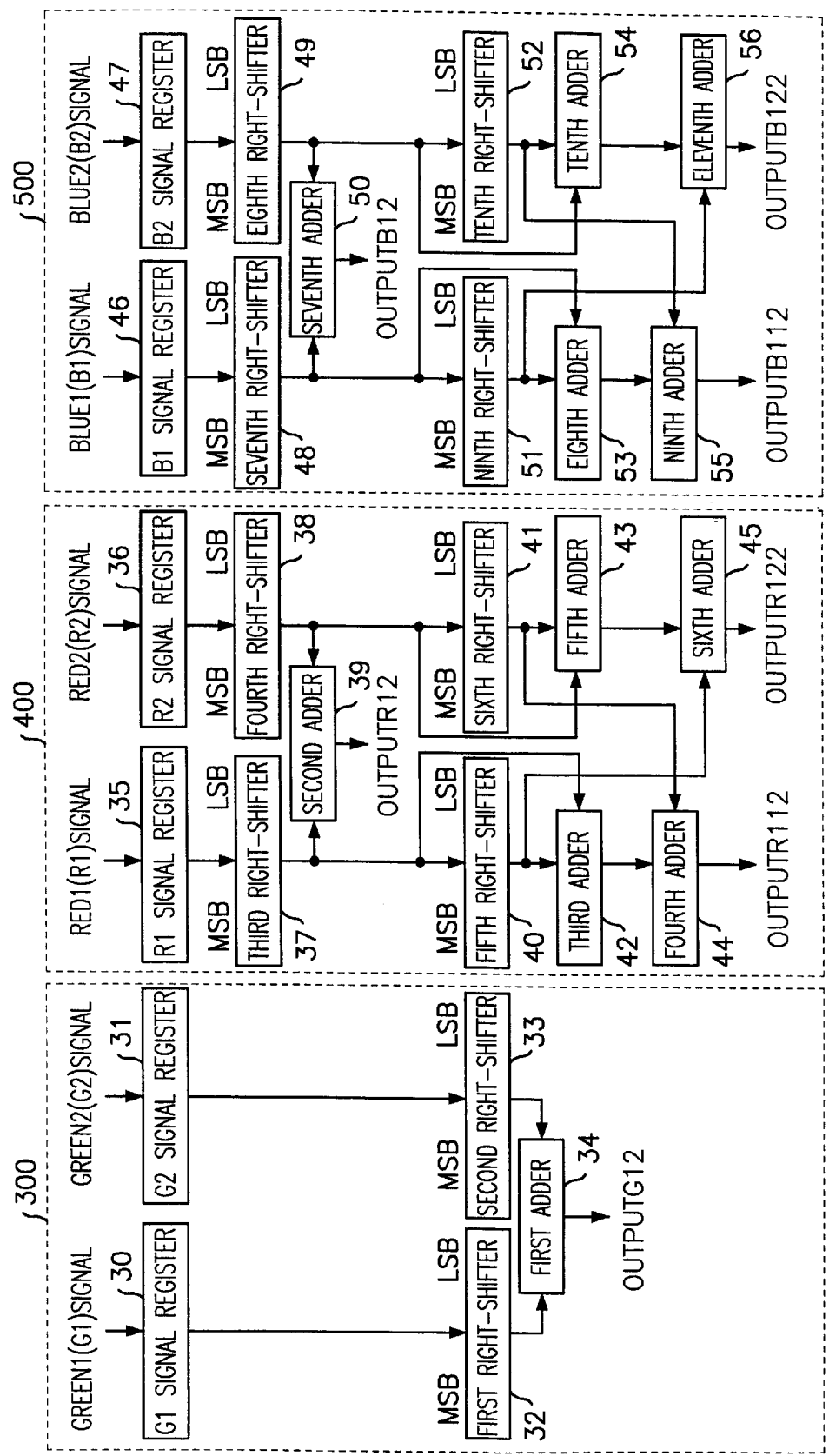
FIG. 3 is a block diagram showing unit for horizontal interpolation process in the structure of color filter array in accordance with the invention.

The object of this invention can be achieved in that the color filter array is constituted such that the number of green color filter becomes double of those of red and blue color filter respectively in order to make human color recognition easy, and that the red and blue color filters are placed every four pixels and green color filter is placed every other pixel, such as a filter pattern consisting of R-G-B-G, G-R-G-R and B-G-R-G filter groups.

Moreover, the object of this invention can be achieved in that the color filter array in which it is constructed such that the number of green color filter becomes double of those of red and blue color filter respectively in order to make human color recognition easy, and in which the red and blue color filters are placed every four pixels and green color filter is placed every other pixel, a filter pattern consisting of R-G-B-G, G-R-G-R and B-G-R-G filter groups, comprises green color signal portion which outputs green color signal of surrounding pixel after interpolating the first and the second green color filter signals which are input from the first and the second filters; red color signal portion which outputs red color signal of surrounding pixel after interpolating the first and the second red color filter signals which are input from the first and the second red color filter; and blue color signal portion which outputs blue color signal of surrounding pixel after interpolating the first and the second blue color filter signals which are input from the first and the second blue color filter.

Figures 1A, 1B:
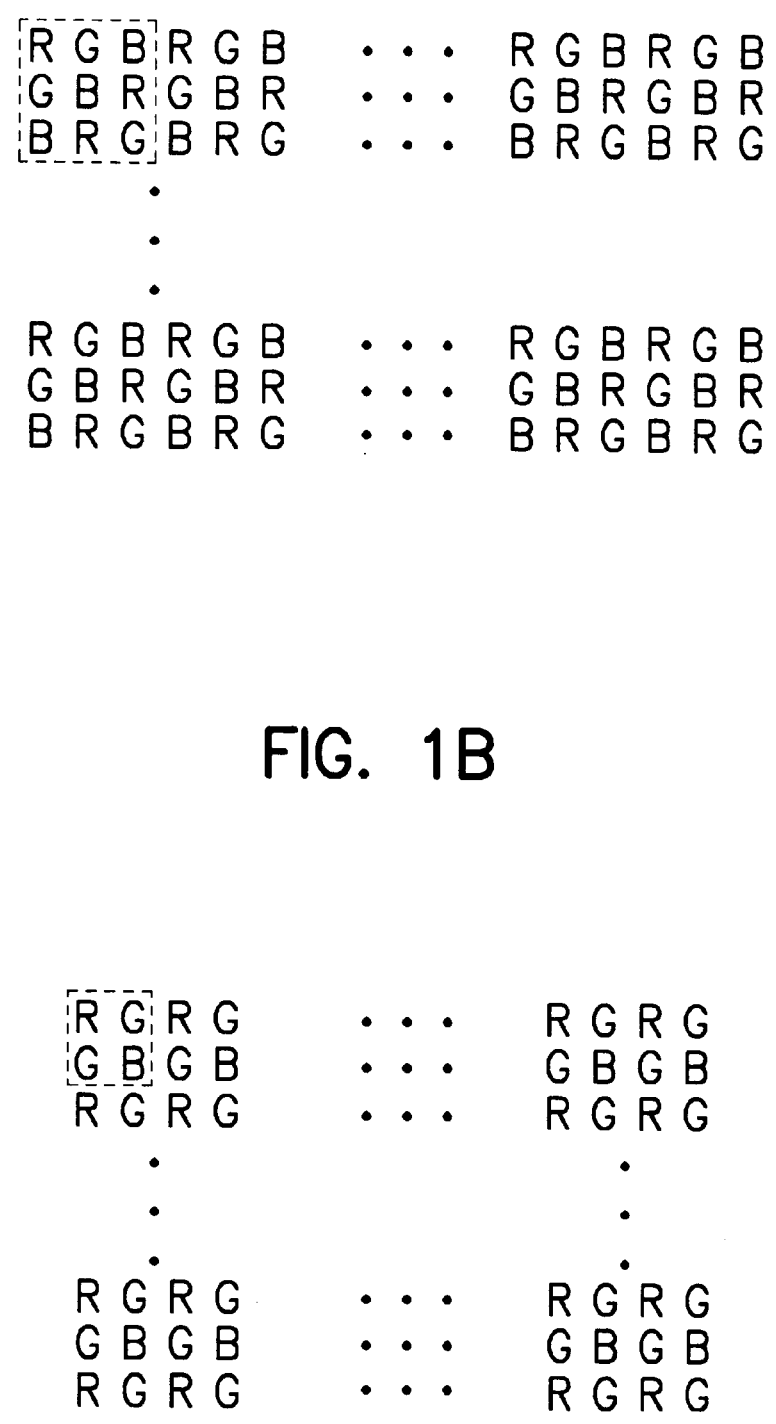
Figure 2:
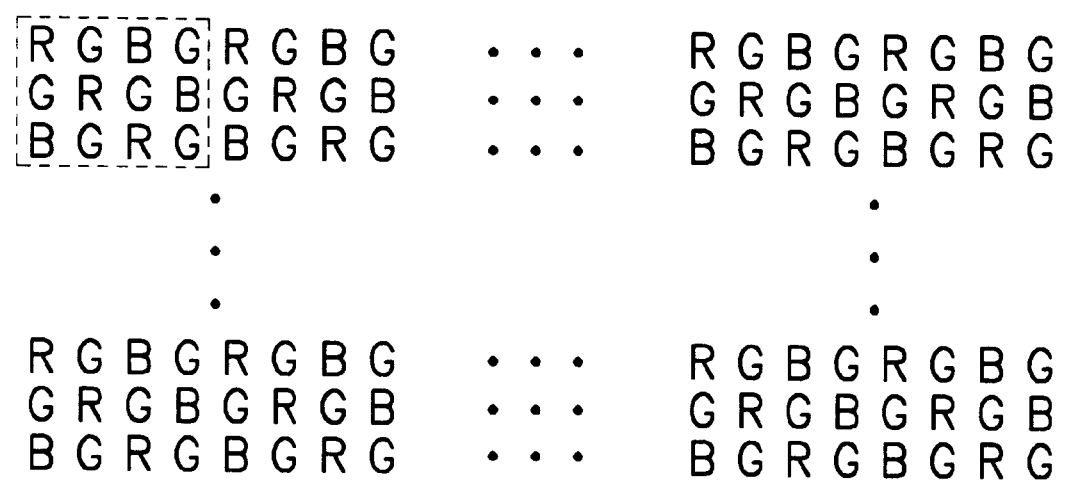

FIG. 2 shows a structure of color filter array, that is, a structure of R-G-B-G, G-R-G-B and B-G-R-G. In order make human recognize the colors, the number of green (G) color filter can be doubled those of red (R) and blue (B) color filters and red (R), green (G) and blue (B) color filters can be placed in the horizontal array. That is, though the red (R) color information and blue (B) color information are placed every other line in the conventional structure of color filter array in FIG. 1b, the information (R, B) are placed in every line in the invention. Accordingly, every pixel can have R, G and B. color signal information with horizontal interpolation process only.

Red (R) and blue (B) color filters are placed every four pixels and green (G) color filters are placed every other pixel so that the interpolation process can be performed with simple addition and shift operations in interpolation calculation. That is, multiplication calculation which is complex and requires much time can be avoided.

FIG. 3 is block diagram showing unit for horizontal interpolation process in the structure of color filter array in accordance with the invention. At first, with reference to FIGS. 2 and 3, since the green (G) color filter is input every other pixel the first green color filter signal (G1) and the second green color filter signal (G2) are multiplied by ½ respectively and added in signal process for color interpolation to each pixel. In that calculation, ½ calculation can be performed by shifting it 1-bit to the direction of lower bit.

Then, since red (R) color filter and blur (B) color filter are input every four pixels, their horizontal interpolation values are obtained from the mathematical equation 2 below;

$R_{112} = \frac{1}{4}(R_1 + 2R_1 + R_2)$, $B_{112} = \frac{1}{4}(B_1 + 2B_1 + B_2)$ $R_{12} = \frac{1}{2}(R_1 + R_2)$, $B_{12} = \frac{1}{2}(B_1 + B_2)$ $R_{122} = \frac{1}{4}(R_1 + R_2 + 2R_2)$, $B_{122} = \frac{1}{4}(B_1 + B_2 + 2B_2)$ In the above mathematical equation 2, $R_1$ represents the first red color filter signal, $R_2$ represents the second red color filter signal, $R_{112}$ represents red color signal for the pixel (covered with green color filter) which is in the near $R_1$ rather than $R_2$ between $R_1$ and $R_2$, $R_{12}$ represents red color signal for the pixel (covered with blue color filter) placed between $R_1$ and $R_2$, $R_{122}$ represents red color signal for the pixel (covered with green color filter) which is in the near $R_2$ rather than $R_1$ between $R_1$ and $R_2$, $B_1$ represents the first blue color filter signal, $B_2$ represents the second blue color filter signal, $B_{112}$ represents blue color signal for the pixel (covered with green color filter) which is in the near $B_1$ rather than $B_2$ between $B_1$ and $B_2$, $B_{12}$ represents blue color signal for the pixel (covered with red color filter) placed between $B_1$ and $B_2$, and $B_{122}$ represents blue color signal for the pixel (covered with green color filter) which is in the near $B_2$ rather than $B_1$ between $B_1$ and $B_2$.

The interpolated values of $R_{112}$ and $B_{112}$ can be obtained from adding the value which comprises 1 bit shifted value plus the 2 bits shifted value of $R_1$ or $B_1$ value to the lower bit direction, to 2 bits shifted value of $R_2$ or $B_2$ to the lower bit direction. In the cases of $R_{12}$ and $B_{12}$, the interpolated values can be obtained from adding the 1 bit shifted value of $R_1$ or $B_1$ to the 1 bit shifted value of $R_2$ or $B_2$.

The interpolated value of $R_{122}$ and $B_{122}$ can be obtained from adding the value which comprises 1 bit shifted value plus the 2 bits shifted value of $R_2$ or $B_2$ value to the lower bit direction, to 2 bits shifted value of $R_1$ or $B_1$ to the lower bit direction.

The circuit construction for such an operation comprises green (G) color signal portion 300 which outputs green color signal ($G_{12}$) of surrounding pixel after interpolating the first and the second green color filter signals ($G_1$, $G_2$) which are input from the first and the second filters, red (R) color signal portion 400 which outputs red color signal ($R_{112}$, $R_{122}$) of surrounding pixel after interpolating the first and the second red color filter signals which are input from the first and the second red color filter, and blue (B) color signal portion 500 which outputs blue color signal ($B_{112}$, $B_{122}$) of surrounding pixel after interpolating the first and the second blue color filter signals ($B_1$, $B_2$) which are input from the first and the second blue color filter.

The green (G) color signal portion 300 comprises the first and the second green color signal registers 30,31 which store the first and the second green color filter signal ($G_1$, $G_2$) input from the green color filter, the first and the second right shifter 32 or 33 which shifts 1 bit of the signal output from the first and the second green color signal register 30 or 31 to the right direction, and the first adder 34 which outputs green color signal ($G_{12}$) of surrounding pixel interpolated after adding the signals output from the first and the second right shifters 32, 33. The red (R) color signal portion 400 comprises the first and the second red color signal registers 35,36 which store the first and the second red color filter signal ($R_1$, $R_2$) input from the red color filter, the third and the fourth right shifter 37 or 38 which shifts 1 bit of the signal output from the first and the second red color signal register 35 or 36 to the right direction, the second adder 39 which outputs red color signal ($R_{12}$) of surrounding pixel interpolated after adding the signals output from the third and the fourth right shifters 37,38, the fifth or the sixth right shifter 40 or 41 which shifts 1 bit of signal output from the third or fourth right shifter 37 or 38 to the right direction, the third adder 42 which adds the signals output from the third and the fifth right shifter 37, 40 again, the fourth adder 44 which outputs red color signal ($R_{112}$) of surrounding pixel interpolated after adding the signals from the sixth right shifter 41 and the third adder 42 again, the fifth adder 43 which adds signals output from the fourth right shifter 38 and the sixth right shifter 41 again, and sixth adder 45 which outputs red color signal ($R_{122}$) of surrounding pixel interpolated after adding signals output from the fifth right shifter 40 and the fifth adder 43 again. The blue (B) color signal portion 500 comprises the first and the second blue color signal registers 46,47 which store the first and the second blue color filter signal ($B_1$,$B_2$) input from the blue color filter, the seventh and the eighth right shifter 48 or 49 which shifts 1 bit of the signal output from the first and the second blue color signal register 46 or 47 to the right direction, the seventh adder 50 which outputs blue color signal ($B_{12}$) of surrounding pixel interpolated after adding the signals output from the seventh and the eighth right shifters 48,49, the ninth or the tenth right shifter 51 or 52 which shifts 1 bit of signal output from the seventh or eighth right shifter 48 or 49 to the right direction, the eighth adder 53 which adds the signals output from the seventh and the ninth right shifter 48, 51 again, the ninth adder 55 which outputs blue color signal ($B_{112}$) of surrounding pixel interpolated after adding the signals from the tenth right shifter 52 and the eighth adder 53 again, the tenth adder 54 which adds signals output from the eighth right shifter 49 and the tenth right shifter 52 again, and eleventh adder 56 which outputs blue color signal ($B_{122}$) of surrounding pixel interpolated after adding signals output from the ninth right shifter 51 and the tenth adder 54 again.

As described above, R, G and B values can be obtained from horizontal interpolation only and the interpolation process can be performed from shift and addition operations.

While the invention has been described in terms of a single preferred embodiment, those skilled in the art will recognize that the invention can be practiced with modification within the spirit and scope of the appended claims.

As apparent from the above-mentioned invention, which has a color filter array which does not need vertical interpolation and can interpolate the color signal for each pixel horizontally using shifter and adder only, it can be applied to the high speed process and can reduce design area and power consumption with simple circuit design.

What is claimed is:

1. An apparatus for processing image signals, the apparatus comprising:

a color filter array constituted such that a number of green color filters becomes double a number of red and blue color filters respectively in order to make human color recognition easy, the red and blue color filters being placed every four pixels and the green color filter being placed every other pixel, such that a filter pattern including R-G-B-G, G-R-G-B and B-G-R-G filter groups is obtained, whereby because the green color filters are placed every other pixel and the red and blue color filters are placed every four pixels, respectively, a particular color signal can be obtained through at least one of addition and multiplication using multiples of ¼.

2. The apparatus according to claim 1, wherein a green color signal for each pixel around the green color filters of the color filter array, can be obtained from multiplying first and second green color filter signals by ½ and adding them since the green color filters are placed every other pixel.

3. The apparatus according to claim 2, wherein ½ of each color filter signal can be obtained from shifting the 1 bit of each color filter signal to a lower bit direction.

4. The apparatus according to claim 1, wherein a red color signal for each pixel covered with a blue color filter between a pixel covered with a first red color filter and a pixel covered with a second red color filter can be obtained from multiplying first and second green color filter signals by ½ and adding them since the red color filter of the red color signal for each pixel around the red color filter of the color filter array is placed every four pixels.

5. The apparatus according to claim 1, wherein a red color signal for each pixel covered with a green color filter placed near a first red color filter between a pixel covered with the first red color filter and a pixel covered with a second red color filter can be obtained from adding a value that is ¼ of the second red color filter signal to a value that is ½ plus ¼ of the first red color filter signal since a red color filter of the red color signal for each pixel around the red color filter of the color filter array is placed every four pixels.

6. The apparatus according to claim 1, wherein a red color signal for each pixel covered with a green color filter placed near a second red color filter between a pixel covered with a first red color filter and a pixel covered with the second red color filter can be obtained from adding a value that is ¼ of the first red color filter signal to a value that is ½ plus ¼ of the second red color filter signal since a red color filter of the red color signal for each pixel around the red color filter of the color filter array is placed every four pixels.

7. The apparatus according to claim 1, wherein a blue color signal for each pixel covered with a red color filter between a pixel covered with a first blue color filter and a pixel covered with a second blue color filter can be obtained from multiplying the first and second blue color filter signals by ½ and adding them since a blue color filter of the blue color signal for each pixel around the blue color filter of the color filter array is placed every four pixels.

8. The apparatus according to claim 1, wherein a blue color signal for each pixel covered with a green color filter placed near a first blue color filter between a pixel covered with the first blue color filter and a pixel covered with a second blue color filter can be obtained from adding a value that is ¼ of the second blue color filter signal to a value that is ½ plus ¼ of the first blue color filter signal since a blue color filter of the blue color signal for each pixel around the blue color filter of the color filter array is placed every four pixels.

9. The apparatus according to claim 1, wherein a blue color signal for each pixel covered with a blue color filter placed near a second blue color filter between a pixel covered with a first blue color filter and a pixel covered with the second blue color filter can be obtained from adding a value that is ¼ of the first blue color filter signal to a value that is ½ plus ¼ of the second blue color filter signal since a blue color filter of the blue color signal for each pixel around the blue color filter of the color filter array is placed every four pixels.

10. An apparatus for interpolating each pixel of a color filter array in which the color filter array is constituted such that a number of green color filters is double a number of red and blue color filters respectively in order to make human color recognition easy, and the red and blue color filters are placed every four pixels and a green color filter is placed every other pixel, such that filter patterns including R-G-B-G, G-R-G-B and B-G-R-G filter groups are obtained, first and second green color filters producing first and second green color filter signals, respectively, first and second red color filters producing first and second red color filter signals, respectively, and first and second blue color filters producing first and second blue color filter signals, respectively, the apparatus comprising:

a green color signal portion which outputs a green color signal of surrounding pixel after interpolating the first and the second green color filter signals which are input from the first and the second green color filters;

a red color signal portion which outputs a red color signal of surrounding pixel after interpolating the first and the second red color filter signals which are input from the first and the second red color filters; and a blue color signal portion which outputs a blue color signal of surrounding pixel after interpolating the first and the second blue color filter signals which are input from the first and the second blue color filters.

11. The apparatus according to claim 10, wherein the green color signal portion comprises:

first and second green color signal storage means which store the first and second green color filter signals input from the first and second green color filters, respectively;

first and second shifting means which shift 1 bit of a signal output from the first and the second green color signal storage means, respectively, to a lower bit direction; and first adder means which outputs a green color signal of the surrounding pixel interpolated after adding signals output from the first shifting means and the second shifting means.

12. The apparatus according to claim 10, wherein the red color signal portion comprises:

first and second red color signal storage means which store the first and second red color filter signals input from the first and second red color filters, respectively;

third and fourth shifting means which shift 1 bit of a signal output from the first and second red color signal storage means, respectively, to a lower bit direction;

second adding means which outputs a red color signal for a pixel covered with a blue color filter between pixels covered with the first red color filter and the second red color filter which are interpolated after adding signals output from the third and fourth shifting means;

fifth and sixth shifting means which shift 1 bit of a signal output from the third and fourth shifting means, respectively, to a lower bit direction;

third adding means which adds signals output from the third and fifth shifting means again;

fourth adding means which outputs a red color signal for a pixel covered with a green color filter placed near the first red color filter between pixels covered with the first red color filter and the second red color filter which are interpolated after adding signals output from the sixth shifting means and the third adding means again;

fifth adding means which adds signals output from the fourth shifting means; and sixth adding means which outputs a red color signal for a pixel covered with a green color filter placed near the second red color filter between pixels covered with the first red color filter and the second red color filter which are interpolated after adding signals output from the fifth shifting means and the fifth adding means again.

13. The apparatus according to claim 10, wherein the blue color signal portion comprises:

first and second blue color signal storage means which store the first and second blue color filter signals input from the first and second blue color filters, respectively;

seventh and eighth shifting means which shift 1 bit of a signal output from the first and second blue color signal storage means, respectively, to a lower bit direction;

seventh adding means which outputs a blue color signal for a pixel covered with a red color filter between pixels covered with the first blue color filter and the second blue color filter which are interpolated after adding signals output from the seventh and eighth shifting means;

ninth and tenth shifting means which shift 1 bit of a signal output from the seventh and eighth shifting means, respectively, to a lower bit direction;

eighth adding means which adds signals output from the seventh and ninth shifting means again;

ninth adding means which outputs a blue color signal for a pixel covered with a green color filter between pixels covered with the first blue color filter and the second blue color filter which are interpolated after adding signals output from the tenth shifting means and the eighth adding means again;

tenth adding means which adds signals output from the eighth shifting means and the tenth shifting means again; and eleventh adding means which outputs a blue color signal of surrounding pixel interpolated after adding signals output from the ninth shifting means and the tenth adding means again.

* * * * *